(12) United States Patent
Maenhout

(10) Patent No.: US 12,263,877 B2
(45) Date of Patent: Apr. 1, 2025

(54) COLLAPSIBLE SHOPPING TROLLEY WITH AUXILIARY ELECTRIC MOTOR

(71) Applicant: MAENHOUT, Bruges (BE)

(72) Inventor: Philippe Maenhout, Bruges (BE)

(73) Assignee: MAENHOUT, Bruges (BE)

( * ) Notice: Subject to any disclaimer, the term of this patent is extended or adjusted under 35 U.S.C. 154(b) by 92 days.

(21) Appl. No.: 18/043,168

(22) PCT Filed: Aug. 27, 2021

(86) PCT No.: PCT/EP2021/073713
§ 371 (c)(1),
(2) Date: Feb. 27, 2023

(87) PCT Pub. No.: WO2022/043482
PCT Pub. Date: Mar. 3, 2022

(65) Prior Publication Data
US 2023/0322285 A1    Oct. 12, 2023

(30) Foreign Application Priority Data

Aug. 28, 2020   (BE) .................................. 2020/0096

(51) Int. Cl.
*B62B 5/00*    (2006.01)
*A45C 13/38*   (2006.01)
(Continued)

(52) U.S. Cl.
CPC .......... *B62B 5/0036* (2013.01); *A45C 13/385* (2013.01); *B60L 53/16* (2019.02);
(Continued)

(58) Field of Classification Search
CPC ....... B62B 5/0036; B62B 3/002; B62B 3/027; B62B 5/0053; B62B 5/0069; B62B 5/06;
(Continued)

(56) References Cited

U.S. PATENT DOCUMENTS 2,564,939 A * 8/1951 Weast ........................ B62B 1/12
280/42
2,901,262 A * 8/1959 Berlin ...................... B62B 3/027
280/47.35
(Continued)

FOREIGN PATENT DOCUMENTS

CA       2354032 A1    1/2003
CN    110182249 A *    8/2019    ............. B62B 3/027
(Continued)

OTHER PUBLICATIONS

ISR-WO for parent application PCT/EP2021/073713 dated Nov. 18, 2021.

*Primary Examiner* — James A Shriver, II
*Assistant Examiner* — Ian Bryce Shelton
(74) *Attorney, Agent, or Firm* — Vorys, Sater, Seymour and Pease LLP

(57) ABSTRACT

An electronic cart includes a frame, an electrically powered rotary motor, a rechargeable battery, and an electrical charging plug-in. The frame comprise a container with an open top end, a bottom end defining the floor, opposite side walls, and a rear wall with an opposite front wall. The container is foldable and has at least one wheel at the front. The frame has at least two wheels at the bottom thereof and a handlebar having control elements. The motor is mounted to the frame on which the container is provided. The motor is configured to drive at least one wheel provided on the frame and is operable and controllable by the handlebar control elements. The battery provides a power supply powering the motor. The battery is approximately attached to the frame. The plug-in is in communication with the battery for charging the battery.

15 Claims, 5 Drawing Sheets

(51) Int. Cl.
*B60L 53/16* (2019.01)
*B62B 3/00* (2006.01)
*B62B 3/02* (2006.01)
*B62B 5/06* (2006.01)

(52) U.S. Cl.
CPC .............. *B62B 3/002* (2013.01); *B62B 3/027* (2013.01); *B62B 5/0053* (2013.01); *B62B 5/0069* (2013.01); *B62B 5/06* (2013.01); *B62B 2301/04* (2013.01)

(58) Field of Classification Search
CPC .............. B62B 2301/04; B62B 3/1468; B62B 2202/12; B62B 2202/26; B62B 2301/02; B62B 5/004; B62B 5/0046; B62B 3/003; A45C 13/385; B60L 53/16
See application file for complete search history.

(56) References Cited

U.S. PATENT DOCUMENTS

| | | | | |
|---|---|---|---|---|
| 3,139,288 | A * | 6/1964 | Peterson | B62B 5/0083 280/79.11 |
| 4,020,916 | A | 5/1977 | Noble | |
| 4,185,848 | A * | 1/1980 | Holtz | B62B 1/12 301/124.1 |
| 4,771,840 | A | 9/1988 | Keller | |
| 5,899,285 | A * | 5/1999 | Curbelo | B62B 5/0026 280/DIG. 4 |
| 6,073,943 | A * | 6/2000 | Serrault | B65F 1/122 280/30 |
| 6,279,672 | B1 | 8/2001 | Losego | |
| 7,784,632 | B2 * | 8/2010 | Truong | B60R 7/02 220/6 |
| 9,796,402 | B1 * | 10/2017 | Suarez | B62B 5/0053 |
| 10,271,623 | B1 * | 4/2019 | Qi | A45C 13/262 |
| 10,407,088 | B1 * | 9/2019 | Le | B62B 5/065 |
| 10,486,052 | B2 * | 11/2019 | Choi | A63C 17/12 |
| 2012/0274052 | A1 * | 11/2012 | Zhu | B62B 3/027 280/651 |
| 2014/0183844 | A1 * | 7/2014 | Iryami | B62B 3/022 280/659 |
| 2017/0320510 | A1 * | 11/2017 | James | B62B 3/025 |
| 2018/0215404 | A1 * | 8/2018 | Hayashi | B62B 5/004 |
| 2018/0353840 | A1 * | 12/2018 | Choi | B60K 7/00 |
| 2018/0370377 | A1 * | 12/2018 | Blacksberg | H02J 7/0013 |
| 2019/0134474 | A1 | 5/2019 | Schneiter | |
| 2020/0257293 | A1 * | 8/2020 | Kanno | G05D 1/0276 |
| 2021/0368952 | A1 * | 12/2021 | Chen | G05D 1/0016 |

FOREIGN PATENT DOCUMENTS

| | | | | |
|---|---|---|---|---|
| DE | 102018004094 | A1 | 11/2019 | |
| EP | 3085600 | A1 * | 10/2016 | ............... B62B 1/10 |
| GB | 2177354 | A * | 1/1987 | ............... B62B 3/14 |
| JP | H07205816 | A * | 8/1995 | |
| KR | 200485017 | Y1 * | 11/2017 | |
| WO | WO-2015028987 | A1 * | 3/2015 | ............. B62B 3/025 |
| WO | WO-2015163804 | A1 * | 10/2015 | ............. B62B 1/12 |
| WO | WO-2020147110 | A1 * | 7/2020 | ............. A45C 15/00 |
| WO | 2022043482 | A1 | 3/2022 | |

* cited by examiner

COLLAPSIBLE SHOPPING TROLLEY WITH AUXILIARY ELECTRIC MOTOR

BACKGROUND OF THE INVENTION

The following contains information that may help understand the present invention. However, it is not an admission that any of the information provided herein is the state of the art or material of the inventions currently described or claimed or that any publication or document specifically or implicitly referenced is state of the art.

FIELD OF THE INVENTION

The present invention generally relates to general-purpose electronic carts and, more particularly, to a rechargeable motorized personal shopping and utility cart.

Designed primarily for but not limited to elderly or infirm consumers who find it difficult to pull or push a manual cart, especially on slopes, the electronic cart powers itself on demand.

Designed in every way for ultimate ease of use, the device also features an easily adjustable wheel system that allows the cart to be propelled in different directions.

DESCRIPTION STATE OF THE ART

Strange as this may seem, today's consumer economy, a shopper's paradise of supermarkets, discount stores, and chain stores, has primarily been created by one invention: the shopping cart.

During the 1930s and 1940s, both cars and electric refrigerators grew in size. As a result, families were able to buy, transport, and store more groceries at home.

However, prior to the shopping cart invention, stores only offered customers wire baskets to pick up and carry their purchases, and these baskets had limited capacity. So, while shoppers had plenty of room in their cars and plenty of room in their refrigerators at home, the stores themselves limited the amount of their purchase. Sylvan Goodman, the founder of the Piggly-Wiggly supermarkets, encountered this problem in the late 1930s and invented a two-basket shopping cart, which evolved into the shopping carts we know today. Goodman's invention allowed consumers to collect, buy and transport much larger volumes—and as a result, the stores themselves began to grow into the supermarkets and superstores we know today.

We may think of shopping carts as a convenience that awaits us in the supermarket, but for millions of consumers—the elderly, apartment dwellers, and city residents, for example—using a personal property, a wheeled utility, or a shopping cart is a personal convenience of everyday life, even a necessity.

Usually, such carts are four-wheeled, lightweight, and upright, made of rubber-covered, sturdy steel wire. The carts are something of a cross between a traditional hand truck or dolly and a commercial shopping cart and can be moved on all four wheels, in a horizontal direction, or just tilted and pulled or pushed on the rear wheels. With these carts, a person can carry much more cargo than he could carry in his hands alone, and a person can carry a load of groceries, for example, from an underground parking deck to a 10th-floor apartment, in one go instead of several.

Still, these personal tools or shopping carts have some significant drawbacks. Chief among these is a simple fact that they must be pushed or pulled—thus requiring an effort beyond the ability of many, especially the elderly, who depend on them.

Several attempts have been made to solve the above problems, such as those found in U.S. Pat. No. 4,020,916 by Roy A. Noble; U.S. Pat. No. 4,771,840 by Richard A. Keller; U.S. Pat. No. 6,279,672 by Martine Losego. This art is representative of self-driving shopping carts.

None of the foregoing inventions and patents, taken individually or in combination, shall be deemed to be the invention as claimed. There is thus a need for a reliable electronic shopping cart, a rechargeable motorized personal (shopping) cart, and a utility.

Designed for elderly or infirm consumers who find it difficult to pull or push a manual cart, especially on slopes, the electronic cart powers itself on demand.

Some electronic carts exist and are described in such documents as U.S. Pat. No. 9,796,402, CA 2 354 032, U.S. Pat. No. 3,139,288, EP 3 085 600, US 2019/134474, DE 10 2018 004094, U.S. Pat. No. 2,564,939 and GB 2 177 354, but not fully handle the problems identified in this application, or provide for an improved electronic cart as per the current invention.

BRIEF SUMMARY OF THE INVENTION

Because of the previous drawbacks inherent in the prior art of the shopping cart, the present invention provides a novel electronic cart.

The general object of the present invention, which will be described in more detail below, is to provide a rechargeable motorized personal utility cart. Designed primarily for, but not limited to, elderly or infirm consumers who find it difficult to pull or push a manual cart, especially on slopes, the electronic cart powers itself on demand.

The set-up of the containers, where the bottom one is foldable and can be supplemented with one or more additional containers, has been designed in all respects for ultimate ease of use.

The electronic cart could be manufactured in a combination of a steel frame and containers composed of plastic.

According to a possible embodiment, it would be equipped with four wheels of which the rear wheels, larger in diameter, are electrically driven on the axle via a central (tube) motor and two smaller, fully rotating spherical shaped ball wheels at the front.

The possibility is hereby provided for the rear wheels to be arranged rotatably, so that the electronic cart can also be moved sideways.

According to another possible embodiment, it would be equipped with four wheels whose rear wheels, larger in diameter, are electrically driven on the axle via a motor on the wheel itself, and two smaller, fully rotating spherical ball wheels in front.

The possibility is hereby provided for the rear wheels to be arranged rotatably so that the electronic cart can also be moved sideways.

An additional possibility to the techniques described in the present patent, the frame is provided with telescopic arms whereby the frame can be adapted in dimensions. This allows the frame to take on different dimensions making the cart suitable for people of different sizes but can also be adapted to different types of luggage that can be moved.

An additional possibility to the techniques described in this patent, whereby the cart is equipped with various control elements such as a braking system, a console in combination with a control element to electronically accelerate or decelerate the cart or even steer in a certain direction including forward or backward.

An additional possibility to the techniques described in this patent whereby the cart is equipped with an autonomous system that allows the cart to autonomously follow its driver or move autonomously from point a to point b by using known systems such as GPS localization, image recognition, sensors mounted on the cart and connected to the control element. The steering of the cart can possibly be supported with an app.

The present invention has significant improvements over prior art electronic shopping carts.

To summarize the invention, certain aspects, advantages, and novel features of the invention are described herein.

Some of the advantages of the present invention are:
The burden of propelling the cart is partially or even completely lifted
The cart can move both straight ahead and sideways
Can accommodate all kinds of luggage
Is modular and therefore multifunctional It should be understood that not necessarily all such advantages can be achieved in accordance with a particular embodiment of the invention. Thus, the invention may be embodied or embodied in a manner that achieves or optimizes one benefit or group of advantages as taught herein without necessarily achieving other advantages as may be taught or implied herein. The features of the invention believed to be novel are particularly set forth and clearly claimed in the concluding portion of the specification. These and other features, aspects, and advantages of the present invention will be better understood with reference to the following drawings and detailed description.

BRIEF DESCRIPTION OF THE DRAWINGS

The figures accompanying the written portion of this specification illustrate an embodiment for the present invention, the electronic cart, constructed and operative in accordance with the teachings of the present invention.

The various embodiments of the present invention will be described below in connection with the accompanying drawings, in which like designations designate like elements.

DETAILED DESCRIPTION

Figure 1:
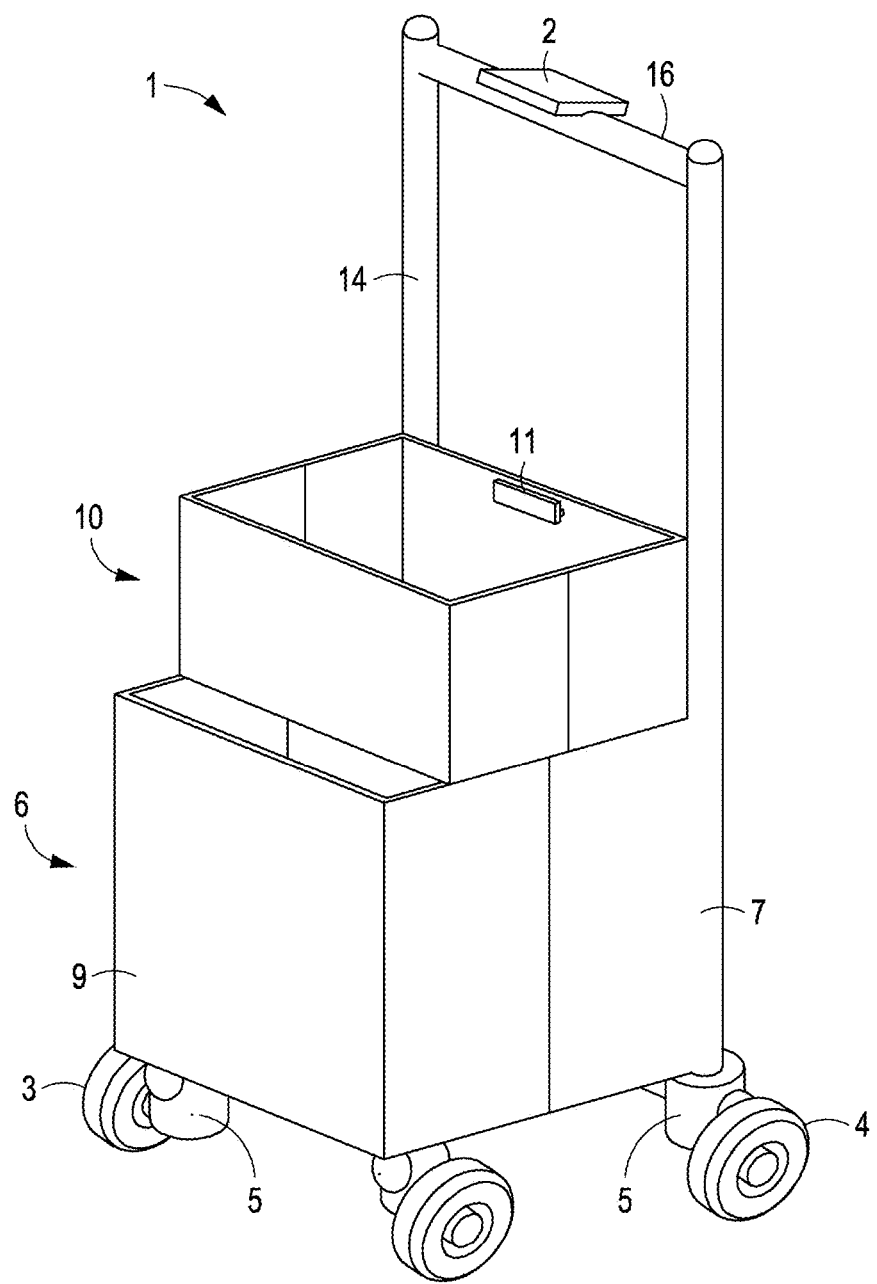
FIG. 1 is a perspective view illustrating an electronic cart according to an embodiment of the present invention in which the wheels are fixedly arranged.

In a preferred embodiment of the invention, the electronic cart comprises a frame for supporting the additional components of the cart, said frame typically being rigid and comprising two or more longitudinal upstanding bars, which are connected by at least two crossbar. At one end of the upstanding bars or shafts, two or more wheels are provided with wheel holders.

Said frame is configured to hold a container, preferably with a square or rectangular profile. Said container has a solid bottom end, an open top end, and said top end can be provided with a lid, possibly hingedly attached to the container. The container has two oppositely positioned side walls, a front wall and a rear wall. At the bottom of the container, at least one, but preferably two, wheel is provided, at the front of the container (distal to the frame).

Said container is at least partly collapsible. This is preferably achieved by the side walls and front walls being adapted to fold against the rear wall and/or the frame, thereby flattening the cart to a minimal thickness. The side and front walls can be detachably attached to the bottom end/bottom plate of the cart, and disconnected when it is to be folded away. After folding the front and side walls against the rear wall, the bottom end or bottom plate can then be folded upwardly, against said front, side and rear wall, and preferably fastened in said position, thereby shielding the underlying walls (partly) and keeping them folded. The container can be folded to a flat configuration by a hinged connection of the sidewalls to the rear wall and to the front wall.

The frame is further provided with a handlebar, preferably adjustable in height, whereupon control elements, typically in the form of a control panel, are provided.

The cart comprises an electrically powered rotary motor, which is mounted to the frame, and configured to drive the wheels on the frame, and preferably also the wheel(s) of the container. Said motor is controlled via the control elements on the handlebar, allowing it to, for instance, be started, stopped, and slowed down or sped up, changing in direction (backwards, forwards) or even locked in direction. In some embodiments, the control elements may even be used to turn the wheels, though this is preferably exacted by the user steering via their own power.

The cart further comprises a rechargeable battery pack for powering the motor. The battery is preferably attached to the frame, near the bottom thereof to provide for a low center of gravity and thereby a comfortable driving experience for the user, as such battery packs are usually heavy and cumbersome. Lastly, the cart comprises a charge connection or plug-in, in electrical communication with the battery, allowing the battery to be recharged. This plug-in can be in the form of a socket that can be provided with a plug connected to a power outlet, and/or can be designed to fit in a specific charging station for the cart.

In a preferred embodiment, the wheels of the frame and/or the wheels of the container are rotatable around an axis perpendicular to the bottom end of the container, preferably over at least 90°.

In a preferred embodiment, the motor drives an axle on the frame, which in turn drives the wheels on the frame, said motor being tubular, wherein the drive imparted on the axle is in turn imparted on the wheels via a transmission.

Preferably, the wheels on the frame are provided with separate drive units, allowing separate control and drive therefor. More preferably, the wheel(s) on the container are likewise provided with a separate drive unit, although said wheels may alternatively be passively provided as rolling support. If the wheels on the container are motorized, then the wiring therefor is preferably integrated into the bottom plate, which serves as a well-protected cover for any electronics integrated therein.

In a preferred embodiment, the control panel may be provided with an electronic port, such as a USB port, for charging an electronic device and/or for programming internal components of the control panel itself.

In a preferred embodiment, the bottom end is substantially rigid. The container is configured to be folded, wherein the side walls comprise a fold line or hinge line over which the side walls can be folded or hinged. Said fold line or hinge line is parallel to the side of the side wall connected to the rear wall, and is preferably centrally positioned on the side wall, allowing the side walls to fold or hinge inwardly, against the rear wall (and front wall), whereby the front wall folds against the side walls. Such a single accordion fold of the side walls, ensures that the width of the folded container is not increased with respect to the unfolded state, while simultaneously keeping the thickness of the fully folded container minimal (in general, equal to the thickness of the front and rear wall and twice the thickness of the sidewalls). The bottom end is rotatably affixed to the frame, allowing it to be rotated upwards, against the frame. Once the sidewalls and front wall are folded against the rear wall, rotating the bottom end upwards against said folded walls, ensures these are protected by the bottom end, which is preferably of a stronger material and/or thicker. The bottom end can then be fastened to the frame, thereby keeping the walls folded as well.

In this light, it should be noted that for the accordion fold to work optimally, be easy to use and keeping the sidewalls structurally sound and the thickness limited, a single fold is preferred, as shown in the Figures. The width of the sidewalls is thereby restricted to be equal to the width of the rear wall at most. In this embodiment, the length of the bottom end or bottom plate, which corresponds to the width of the sidewalls, is preferably at least 50%, and more preferably at least 60% or even 70%, of the height of the front wall and/or sidewalls, this to ensure a prober securing of said front and sidewalls.

Most preferably, the wheels on the container are adapted to allow folding them against the bottom end or bottom plate. This allows making the folded container even more compact. The wheels are preferably attached to the bottom end via a wheel holder, which comprises a hinge section that allows it to be folded entirely against the bottom end, thereby also positioning the wheel against the bottom end.

In a preferred embodiment, the frame comprises one or more fastening elements or attachment mechanisms adapted for affixing a secondary or additional container thereto. These can be in the form of one or more protrusions over which corresponding sections of the container can be hung, or hooked onto. Preferably, the upper edges of the container is adapted to provide support for said secondary container. This can be achieved by thickened and/or reinforced edges and/or corners of the container, and potentially also mutually coupling elements on both the upper edges of the container and on the bottom of the secondary container. By combining this with the attachment mechanisms on the frame, the secondary container can be reliably affixed onto the cart.

In some embodiments, the container is modular, in the sense that the sidewalls, front wall, and/or rear wall can be removed and replaced by other components, for instance a wall with an inbuilt door, an additional attachment mechanism or clamping mechanism to which other items can be fastened, or even panels with additional wheels.

In a preferred embodiment, the rear wall is fixedly attached to, or even single-piece with, the frame, and forms a structural part thereof, reinforcing it.

In a preferred embodiment, the cart is provided with a positioning system or a tracker, preferably inbuilt into the control panel, the motor or the battery.

In a preferred embodiment, the bottom end or bottom plate and the rear wall, sidewalls and front wall are detachably connected, and preferably connect automatically when unfolded. This can be via a so-called leveraged snap-fit connection, where the bottom plate on the one hand and/or the rear wall, sidewalls and front wall on the other hand are displaced with respect to each other into a force-biased positioned, with the resting state being closer to each other and even connected via the snap-fit connection.

Alternatively, the container may be configured so that the bottom plate on the one hand and/or the walls on the other hand are brought closer to each other by a mechanism that only takes effect when the walls are fully unfolded. This mechanism is preferably sufficient (or almost) to overcome the resistance of the snap-fit connection mechanism.

In the above, a snap-fit connection was mentioned, but other types of connection mechanisms may be applied as an alternative. Preferably however, said mechanisms all operate under the rule that to disconnect or detach, a deliberate action by the user is necessary, so that they do not simply detach due to the weight affecting the container.

The wheels of the cart are preferably divided into two separate subsets. The wheels at the front or front wheels, which are affixed to the container, and more exactly, to the bottom plate thereof, and the wheels at the rear or rear wheels, which are affixed to the frame. In both cases, the wheels are held in wheel holders, which in turn are connected to the structure of the cart.

Preferably, the front wheels are not motorized, although in a variant, they can be motorized, preferably with their own drive unit then. The front wheels are rotatable around an axis perpendicular to the bottom plate, preferably via the wheel holders rotating. Most preferably, the wheel holders are hingedly or foldably connected to the bottom plate, allowing them to be folded against the bottom plate. To this end, the wheel holders may have a hinge section internally, allowing the wheel holder to essentially fold against the bottom end (over about 90°), which can ensure that the wheels can be brought into a position that is parallel to the bottom plate. If the connection of the wheel holders to the bottom plate were to hinge, this would only lead to a skewed position for the wheel holders, which in general takes up more space. Preferably, by aptly choosing the distance of the hinge section on the wheel holder to correspond to about half of the thickness of the wheel holder and wheels themselves, it is ensured that the folded wheel holder/wheel rests against the bottom plate to minimize thickness of the folded configuration.

In some embodiments, the bottom end is provided with recesses into which the wheels and wheel holders can be folded (at least partly), to have as little as possible parts protruding from the bottom end. The effect this would have on the strength of the bottom end is minimal, while it can reduce the thickness of the entire system significantly and remove possibly hindering protrusions that can damage other objects (car for instance when loading or unloading the cart) or hurt people.

The rear wheels are likewise provided on wheel holders. Said wheel holders are motorized, and can in some embodiments be actuated separately, allowing the user to use the separately operating wheels to steer the cart more efficiently. This is especially useful when the cart is heavily burdened.

In preferred embodiments, the wheel holders of the rear wheels are rotatably attached to the frame, allowing rotation around an axis that is essentially parallel to the longitudinal axis of the frame. The wheels holders and rear wheels may be foldably affixed to the frame, as described for the front wheels, though this is less crucial than with the front wheels. The rear wheels will typically still serves as a transport aide even when the cart is folded, and do not significantly change the thickness of the folded configuration of the cart, only lengthening it slightly.

As discussed above, the various embodiments of the present invention relate to an electronic cart 1 and, more particularly to an electronically controlled cart 1, which can also serve as a shopping cart 1. Designed for elderly or infirm consumers who find it difficult to pull or push a manual cart 1, especially on slopes, the electronic cart 1 would propel itself on demand. The structure of the device has been designed in all respects for ultimate convenience and modularity.

FIG. 1 is a perspective view illustrating an electronic cart 1 according to an embodiment of the present invention in which the wheels are fixedly arranged. It is provided with a console 2 for controlling the electrical part and the brakes. The wheels 3 are fixed in this arrangement and are held by the wheel holders 5. The frame 14 is provided with a handlebar 16 and a folding container 6. This folding container 6 is provided with folding side walls 7, a rear wall 8, a front wall 9 and a foldable bottom end or plate 15. A separate container 10 can also be provided on the folding container 6, which may or may not be foldable and which can be secured via an attachment 11 over which the separate container 10 can be hung in order to prevent the loose container from falling 10.

Also, the bottom of the loose container 10 can be made to fit into the frame 14 of the folding container 6.

The frame 14 typically comprises two upstanding sections which are connected at their ends by a crossbar which can comprise the console. At the other ends of the upstanding sections, these are typically connected to a wheel axis on which the wheels 4 are mounted, or to which the wheel holders 5 are positioned, holding the wheels 4. Said wheel holders 5 may be rotatably attached to the wheel axis. The bottom plate 15 is preferably rotatably connected to said wheel axis or to an axis perpendicular thereto, which perpendicular axis connects both upstanding sections of the frame 14.

Figure 2:
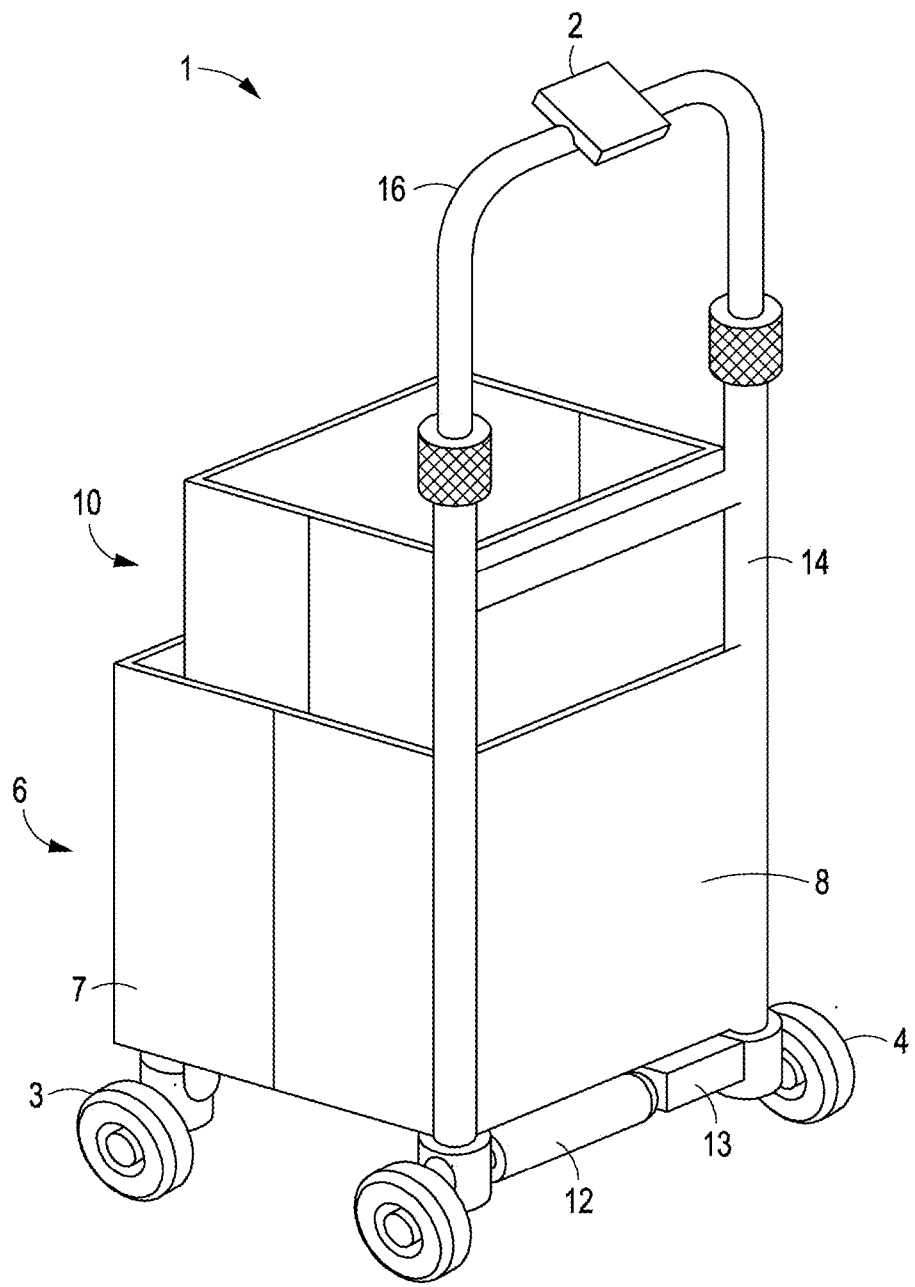
FIG. 2 is a rear perspective view illustrating the control panel of the electronic cart according to an embodiment of the present invention of FIG. 1.

FIG. 2 is a rear perspective view illustrating the control panel of the electronic cart 1 showing the tubular motor 12 and the rechargeable battery 13 and where the frame 14 is provided with a handlebar 16 that can be height-adjustable and has a U-shape as shown. The tubular motor 12 drives the 2 rear wheels 4 via a rigid shaft.

Figure 3:
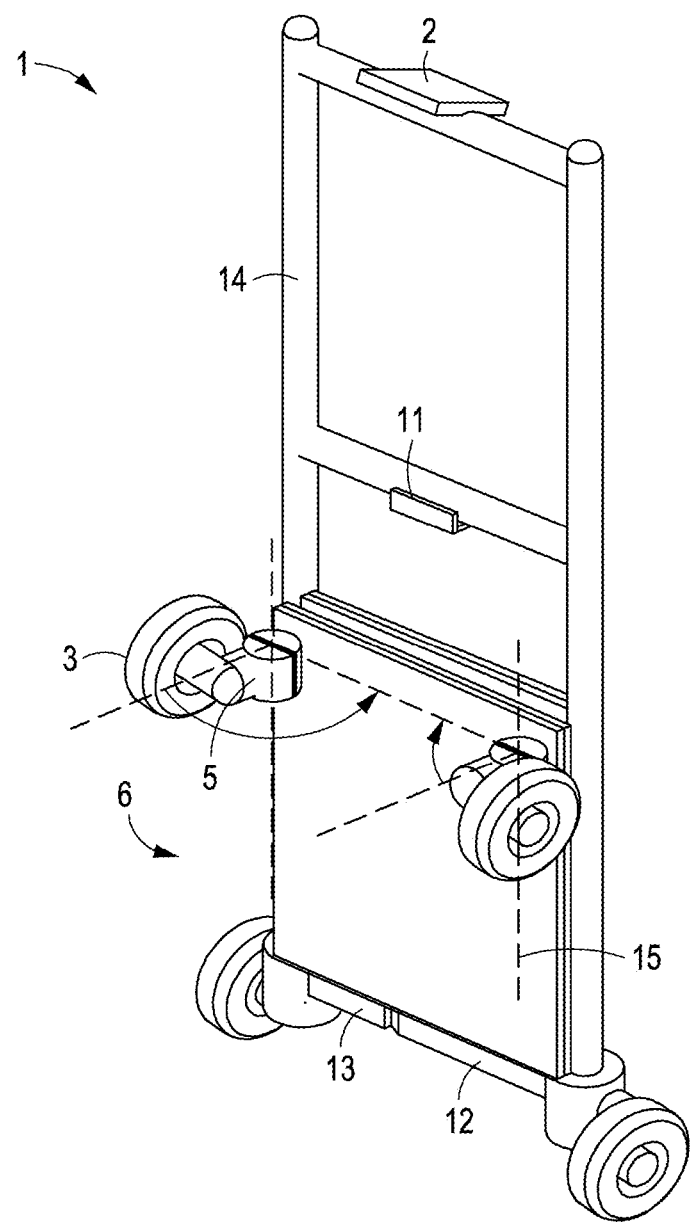
FIG. 3 is a perspective view illustrating the electronic cart in folded form according to an embodiment of the present invention of FIG. 1.

FIG. 3 is a perspective view illustrating the electric or electronic cart 1 in folded form. It is equipped with a console 2 to control the electrical part and the brakes. The wheels 3 are fixed in this arrangement and are held by the wheel holders 5. The frame 14 is provided with a handlebar 16 and a folding container 6. This folding container 6 is provided with folding side walls 7, a rear wall 8, a front wall 9, and a folding container bottom plate or end 15. This folding container 6 is folded in this arrangement. In this arrangement, the wheel holders 5 have an internal hinge section 17, allowing the wheel holders 5 to fold the wheels 3 against the bottom end of plate 15. A mounting 11 is provided on the frame 14 over which the separate container 10 can be hung.

Figure 4:
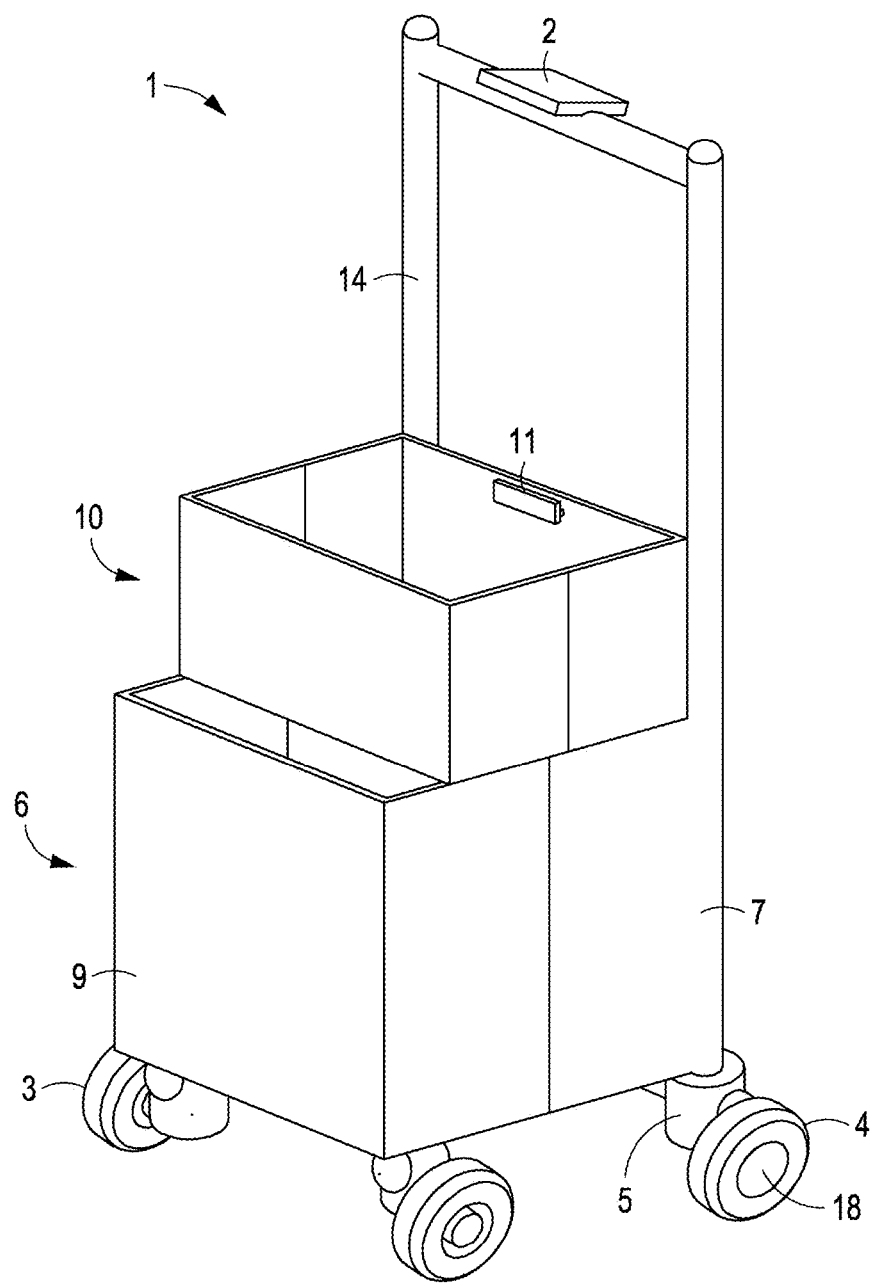
FIG. 4 is a front perspective view of the electronic cart where the electric drive is integrated in the wheels according to an embodiment of the present invention of FIG. 1.

FIG. 4 is a front perspective view of the electronic cart 1 where the electric drive is integrated into the wheels. It is equipped with a console 2 to control the electrical part and the brakes. In this arrangement, the wheels 4 are rotatably arranged in a vertical sense and are held by the wheel holders 5. As a result, the cart 1 can also move in a lateral sense. The cart 1 is driven by the rear wheels 4, in which each wheel 4 has an electric motor 18 mounted. The frame 14 is provided with a handlebar 16 and a folding container 6. This folding container 6 is provided with folding side walls 7, a rear wall 8, a front wall 9, and a foldable bottom end or plate 15. A separate container 10 can also be provided on the folding container 6, which may or may not be foldable and can be secured via an attachment 11 over which the loose container 10 can be hung so as to prevent the loose container 10 from falling.

Figure 5:
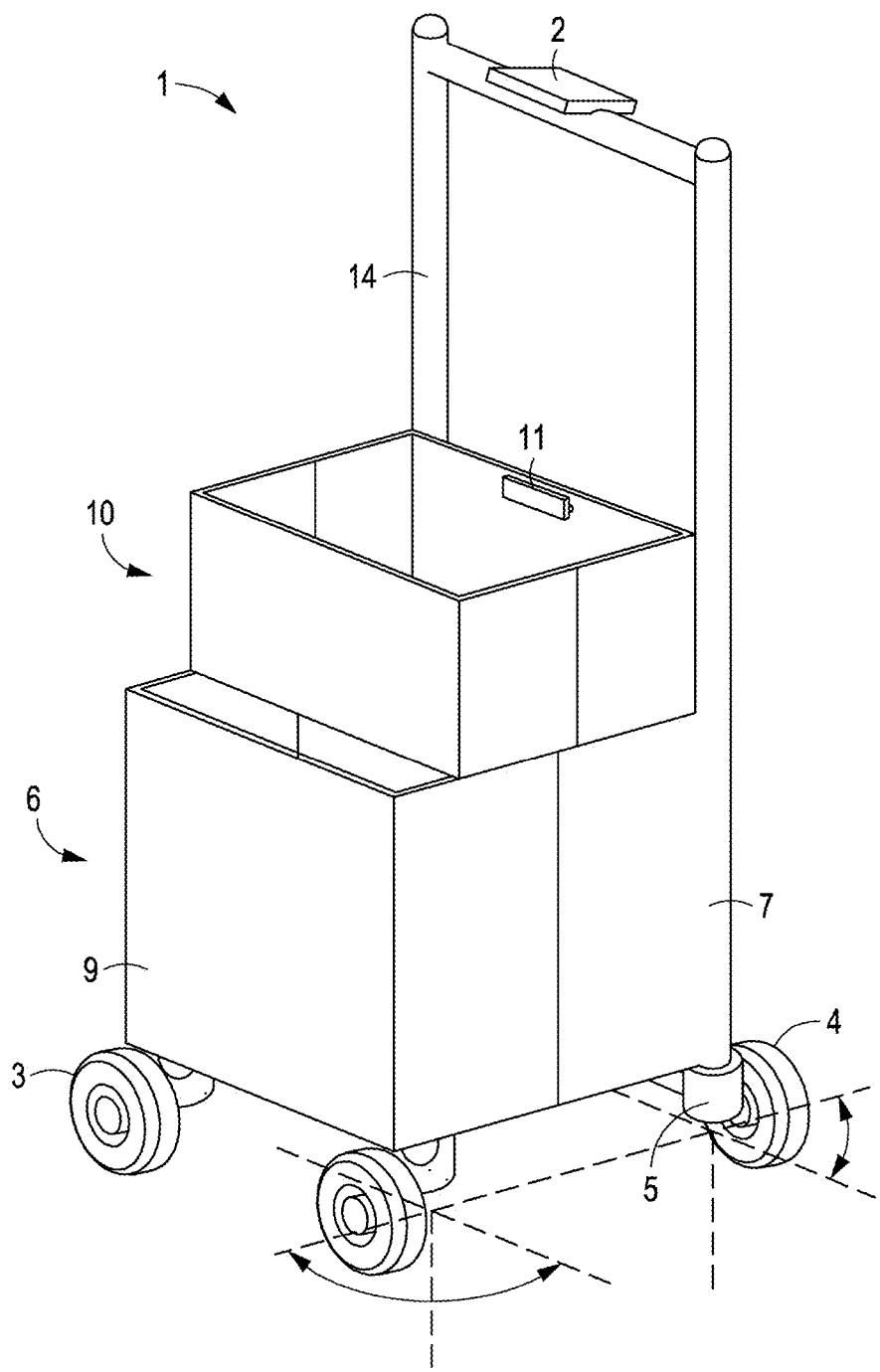
FIG. 5 is a front perspective view of the electronic cart with the wheels rotated 90° with respect to the embodiment of the present invention of FIG. 1. This allows the electronic cart to be moved sideways.

FIG. 5 is a front perspective view of the electronic cart 1 with the wheels rotated 90°. It is provided with a console 2 to control the electrical part and the brakes. The wheels 3 in this arrangement are rotatably arranged in a vertical sense and are held by the wheel holders 5. As a result, the cart 1 can also move in a lateral sense. The drive of the electric tubular motor 12 is transmitted via a transmission to the rear wheels 4 via a transmission system. The frame 14 is provided with a handlebar 16 and a folding container 6. This folding container 6 is provided with folding side walls 7, a rear wall 8, a front wall 9, and a folding bottom plate 15. A separate container 10 can also be provided on the folding container 6, which may or may not be foldable and can be secured via an attachment 11 over which the loose container 10 can be hung so as to prevent the loose container 10 from falling.

An additional possibility to the techniques described in the present patent, is that the wheels 4 that are connected to the folding container 6 can be folded away. It is essential that the electronic cart 1 takes up as little space as possible when folding. In the embodiment where the wheels 4 can be folded away, the drive is preferably provided in the wheels 4 themselves. The drive can be supplied with electric current via a flexible electrical cable.

In FIG. 5 the electronic cart 1 is shown in a folded state. The wheels 4 that are connected to the folded container 6 are not folded away in this condition. In this embodiment, a few pivot points are provided, which allow the electronic cart 1 to move in all directions when active.

In an additional embodiment, this hinge can be supplemented per wheel with at least 1 additional hinge point. This allows the wheels 4 to make an additional movement of 90° relative to the bottom plate 15 so that the wheels 4 come to positioned parallel with the bottom plate 15 and therefore take up less space.

As illustrated in FIG. 3, the sidewalls 7 fold inwards according to the harmonica principle, whereby the front wall 9 comes to lie over the inwardly folded sidewalls 7. After this, the bottom plate 15 can be folded upwards, shielding the sidewalls 7 and the front wall 9. This clamps the sidewalls 7 and front wall 9 between the bottom plate 15 and frame 14.

In this position, the upper wheels 4 are perpendicular to the frame 14 and in line with the lower wheels. This makes it very easy to roll the electronic cart 1 into, for example, a trunk. Additionally, the folded electronic cart 1 can also be electrically powered, allowing it to be used to move heavier items into or out of a particular space such as a trunk.

As illustrated in FIG. 4, the capacity of the lower folding container 6 can be expanded by placing an extra separate container 10. The shape of the bottom plate 15 of this extra separate container 10 can be shaped so that it fits on the folding container 6, additional an extra thickening is provided that fits in the folding container 6 so that the extra separate container cannot move. In addition, an extra fastening 11 can be provided in which the top container 10 can be hooked or clicked.

In an additional embodiment, the sidewalls 7 and the front wall 9 can be removed, making it possible to place objects larger than the foldable base container on the bottom plate 15.

In an additional embodiment, all four wheels 4 can be driven so that the electronic cart 1 can also pull itself up or over an obstacle such as stairs, sills, etc.

In an additional embodiment, the lower folding container 6 can be provided with a sliding mechanism at the top on the sidewalls 7 which makes it possible to slide additional containers 10 on top of the basic folding container 6. The additional containers 10 can then be slid directly onto the electronic cart 1 from a luggage compartment, for example. This guide mechanism can be constructed from a rail over which wheels can run. These are placed on the top of the sidewalls 7 of the lower container. The additional container 10 that is placed on top of the lower basic folding container 6 has wheels on the bottom plate. Preferably the number is four and the wheels are placed on the corners of the bottom of the container 10. The wheels themselves have a recess in the middle of the barrel via which they fit over the rail of the base container 6. This guides the additional container 10 on the correct path when installing the container 10 without it falling off.

The wheels on the additional container 10 can also be blocked to prevent the additional container 10 from rolling off the basic folding container 6 or rolling during transport, e.g. in the trunk of a car.

Electric/electronic cart: this is the subject of the invention.
1. Electric/electronic cart
2. Console: this controls the electronic cart. This can make the case move forwards or backward, accelerate or decelerate, read the battery status, brake, etc. This console can be equipped with physical buttons and a touchscreen or a combination of the above.
3. Wheels: These are the wheels of the electronic cart through which it can be propelled, if not arranged in rotation along the vertical axis.
4. Motorized wheels: These are the wheels of the electronic cart that are propelled with an electric motor, if not installed in a rotating manner following the vertical axis.
5. Wheel holder: These serve as a holder for the wheels.
6. Folding container: This is a folding container that is part of the electronic cart. This may or may not be removable.
7. Sidewalls: These are the sidewalls of the folding container
8. Rear wall: This is the back wall of the folding container
9. Front wall: This is the front of the folding container
10. Separate container: This is a storage container that does not belong to the standard configuration of the electronic cart, but can be added additionally and attached to the attachment against falling
11. Fastening: This is a device to which the separate container can be attached, possibly via a click system
12. Tubular motor: Here, the motor is mounted on the shaft, whereby one or more wheels can be driven.
13. Battery: This is a rechargeable battery to power the electric motor and possibly also the console
14. Frame: This is the frame of the electronic cart on which all parts are mounted
15. Bottom plate: This is the bottom of the folding container.
16. Handlebar: This is to steer the cart manually.

The embodiments of the invention described herein are exemplary, and numerous modifications, variations, and rearrangements can be readily contemplated to achieve substantially equivalent results, all of which are intended to be encompassed within the spirit and scope of the invention.

The invention claimed is:

1. An electronic cart comprising:
 a frame comprising:
  a container with an open top end, a bottom end defining the floor, opposite side walls, a rear wall with an opposite front wall,
   wherein the container is foldable, wherein the side walls and front wall are configured to fold against the rear wall and/or the frame, and the bottom end is configured to fold upwardly, against the underlying walls,
   wherein the frame is provided with at least two wheels at the bottom thereof, and
   wherein the container is provided with at least one wheel at the front of the container, and wherein the at least one wheel is mounted on and foldable against the bottom end of the container; and
  a handlebar having control elements;
 an electrically powered rotary motor mounted to the frame on which the container is provided, the motor being configured to drive at least one of the wheels provided on the frame, wherein the motor is operable and controllable by the control elements of the handlebar;
 a rechargeable battery for providing a power supply and powering the motor, the rechargeable battery being approximately attached to the frame;
 an electrical charging plug-in in communication with the rechargeable battery for charging the rechargeable battery.

2. The electronic cart according to claim 1, wherein both the wheels on the frame and the at least one wheel mounted on the bottom end of the container are rotatable over at least 90° with respect to an axis perpendicular to the bottom end of the unfolded container, whereby the electronic cart is movable in at least two directions.

3. The electronic cart according to claim 1, wherein an axle on the frame is motorized in a manner that the rotation imparted by the motor drives at least one of the wheels on the frame.

4. The electronic cart according to claim 1, wherein at least one wheel on the frame is provided with a separate drive unit for driving the at least one wheel on the frame.

5. The electronic cart according to claim 1, wherein all wheels can be locked in a specific direction to achieve smooth operation.

6. The electronic cart according to claim 1, wherein the control elements are in the form of a control panel comprising a power switch, a speed control, a forward control for activating and controlling the motor.

7. The electronic cart according to claim 1, wherein the control elements are in the form of a control panel comprising a USB port wherein the USB port can be used for charging an electronic device, for programming the control panel itself, or both.

8. The electronic cart according to claim 1 wherein the bottom end is substantially rigid;
 wherein the container is configured to be folded, wherein the side walls comprise a fold line or hinge line over which the side walls can be folded or hinged, the fold line or hinge line parallel to the side of the side wall connected to the rear wall, allowing the side walls to fold or hinge inwardly, against the rear wall, whereby the front wall folds against the side walls;

wherein the bottom end is rotatably attached to the frame, and is configured to be rotated around an axis parallel to a wheel axis connecting the wheel holders of the wheels of the frame, and wherein the bottom end is configured to fold upwardly around the wheel axis, thereby folding against the front wall.

9. The electronic cart according to claim 1, wherein the frame is provided with at least one additional mechanism for attaching an additional container which can be placed on the container.

10. The electronic cart according to claim 1, wherein the sidewalls is configured to be collapsed with an accordion fold, wherein the sidewalls have a width equal to or smaller than the width of the rear wall, and wherein the bottom end has a length at least 50%, of the height of the side walls, wherein the length of the bottom end is the distance between the sides attached to the front and rear wall.

11. The electronic cart according to claim 1, wherein a positioning system is provided for retrieving the electronic cart.

12. The electronic cart according to claim 1, wherein the at least one wheel of the container is foldable against the bottom end of the container, with the wheels parallel to the bottom end.

13. The electronic cart according to claim 12, wherein the at least one wheel of the container is mounted on the bottom end of the container via wheel holders, at least part of the wheel holders are rotatable with respect to the bottom end around an axis perpendicular to the bottom end, and wherein the wheel holders are hingably attached to the bottom end, allowing hinged rotation of the wheel holders against the bottom end around an axis parallel to an edge of the bottom end.

14. The electronic cart according to claim 1, wherein the frame comprises two upstanding shafts, which are connected at or near a top end thereof by the handlebar, and at or near a bottom end thereof by a wheel axis, to which the bottom end of the container is rotatably attached.

15. An electronic cart comprising:
a square or rectangular frame comprising a container with an open top end, a bottom end defining the floor, opposite side walls, a rear wall with an opposite front wall,
wherein the container is foldable, wherein the side walls and front wall are configured to fold against the rear wall and/or the frame, and the bottom end is configured to fold upwardly, against the underlying walls,
wherein the frame is provided with at least two wheels at the bottom of the frame, and
wherein the container is provided with at least two wheels at the front of the container, and wherein the at least two wheels are mounted on and foldable against the bottom end of the container, and
wherein all wheels can be locked in a specific direction to achieve smooth operation;
the frame further comprising a height-adjustable, U-shaped handlebar and having control elements in the form of a control panel;
an electrically powered rotary motor mounted to the frame on which the container is provided, the motor being configured to drive at least one of the wheels provided on the frame,
wherein the motor is operable and controllable by the control elements of the handlebar;
a rechargeable battery for providing a power supply and powering the motor, the rechargeable battery being approximately attached to the frame;
an electrical charging plug-in in communication with the rechargeable battery for charging the rechargeable battery.

\* \* \* \* \*